(12) United States Patent
Minami et al.

(10) Patent No.: US 11,126,183 B2
(45) Date of Patent: Sep. 21, 2021

(54) STEERING CONTROL APPARATUS FOR AIRCRAFT

(71) Applicant: SUMITOMO PRECISION PRODUCTS CO., LTD., Hyogo (JP)

(72) Inventors: Yutaro Minami, Amagasaki (JP); Atsushi Yamazaki, Amagasaki (JP)

(73) Assignee: SUMITOMO PRECISION PRODUCTS CO., LTD., Hyogo (JP)

( * ) Notice: Subject to any disclaimer, the term of this patent is extended or adjusted under 35 U.S.C. 154(b) by 301 days.

(21) Appl. No.: 16/332,227

(22) PCT Filed: Sep. 15, 2016

(86) PCT No.: PCT/JP2016/077350
§ 371 (c)(1),
(2) Date: Mar. 11, 2019

(87) PCT Pub. No.: WO2018/051474
PCT Pub. Date: Mar. 22, 2018

(65) Prior Publication Data
US 2019/0235503 A1    Aug. 1, 2019

(51) Int. Cl.
*B62D 9/02* (2006.01)
*B60K 23/04* (2006.01)
(Continued)

(52) U.S. Cl.
CPC ........... *G05D 1/0202* (2013.01); *B64C 25/50* (2013.01)

(58) Field of Classification Search
CPC .......... G05D 1/02; G05D 1/0202; B62D 6/10; B62D 5/04; B62D 5/00; B62D 15/02;
(Continued)

(56) References Cited

U.S. PATENT DOCUMENTS 3,596,401 A * 8/1971 Camire .................. A63H 18/10
                                                        446/130
4,143,970 A * 3/1979 Lill ...................... G01B 11/275
                                                        356/139.09
(Continued)

FOREIGN PATENT DOCUMENTS

JP        5860741 B2    2/2016

OTHER PUBLICATIONS

International Search Report issued in PCT/JP2016/077350; dated Nov. 1, 2016.

*Primary Examiner* — Yuri Kan
(74) *Attorney, Agent, or Firm* — Studebaker & Brackett PC

(57) ABSTRACT

A target steering angle determining section determines a target steering angle based on the operation amount of the steering gear. A target angle setting section sets a target angle of a steered wheel. A control state switching section switches between an enabled state in which steering control is performed to deflect the steered wheel such that an actual steering angle reaches the target angle and a disabled state in which the steering control is not performed. When the steering control state is switched to the enabled state, the target angle setting section sets the target angle to an angle that was brought closer to the actual steering angle from the target steering angle. After the steering control state is switched to the enabled state, the target angle setting section brings the target angle closer to the target steering angle as time passes.

5 Claims, 10 Drawing Sheets

(51) Int. Cl.
 *G05D 1/02* (2020.01)
 *B64C 25/50* (2006.01)
(58) Field of Classification Search
 CPC ......... B62D 6/00; F16H 61/22; B60G 17/016;
  B60G 7/00; B60K 28/16; B60K 1/00;
  G01B 11/275; A01B 69/00; B63H 25/00;
  A63H 17/36
 See application file for complete search history.

(56) References Cited

U.S. PATENT DOCUMENTS

| | | | | |
|---|---|---|---|---|
| 4,796,720 | A * | 1/1989 | Bauer | B60G 17/0163 180/234 |
| 7,957,866 | B2 * | 6/2011 | Oba | B66F 9/07568 701/41 |
| 10,065,675 | B2 * | 9/2018 | Codonesu | B62D 6/002 |
| 2002/0129985 | A1 * | 9/2002 | Nissen | B66F 9/07568 180/197 |
| 2007/0295545 | A1 * | 12/2007 | Romig | B60W 10/08 180/197 |
| 2008/0007022 | A1 * | 1/2008 | Jones | B60G 3/16 280/124.13 |
| 2008/0115711 | A1 * | 5/2008 | Mizutani | B63H 20/12 114/144 RE |
| 2014/0297119 | A1 * | 10/2014 | Giovanardi | B60G 17/016 701/38 |
| 2014/0303848 | A1 * | 10/2014 | Bean | B62D 5/0463 701/41 |
| 2014/0303864 | A1 * | 10/2014 | Karlsson | F16H 61/22 701/69 |
| 2017/0008563 | A1 * | 1/2017 | Popken | G06K 9/00671 |
| 2018/0015948 | A1 * | 1/2018 | Varunjikar | B62D 5/0463 |

* cited by examiner

STEERING CONTROL APPARATUS FOR AIRCRAFT

TECHNICAL FIELD

The present invention relates to a steering control apparatus, and more particularly relates to a steering control apparatus for an aircraft.

BACKGROUND ART

A steering control apparatus for landing gear of an aircraft is disclosed, for example, in JP5860741B (Patent Literature 1). In a case where the aircraft is taxiing and the traveling speed of the aircraft is not higher than a prescribed speed, the aforementioned control apparatus switches from a state in which a steering operation by a steering mechanism (hereunder, referred to as "steering control") is disabled (hereunder, referred to as "disabled state") to a state in which the steering control is enabled (hereunder, referred to as "enabled state"). In other words, even when the aircraft is taxiing, a steering operation by the steering mechanism is kept in a disabled state until the traveling speed of the aircraft becomes equal to or less than a prescribed speed. By this means, when the aircraft is touching down, even if the orientation of the steered wheel is different from the travelling direction of the aircraft, upon the steered wheel contacting the ground, the orientation of the steered wheel changes to the travelling direction of the aircraft with the least resistance. As a result, the occurrence of a situation in which an excessive load in the lateral direction acts on the steered wheel is suppressed.

CITATION LIST

Patent Literature

Patent Literature 1: JP5860741B

SUMMARY OF INVENTION

Technical Problem

However, in the steering control apparatus disclosed in Patent Literature 1, when the aircraft starts taxiing and the steering control is switched from the disabled state to the enabled state, in some cases there is a large difference between a target steering angle, which is an angle the steered wheel should deflect and which is determined by an operation of a rudder or the like by the pilot, and the actual steering angle of the steered wheel. In such a case, the steering control apparatus deflects the steered wheel such that the actual steering angle reaches the target steering angle. Consequently, the steered wheel operates abruptly. Such kind of abrupt operation of the steered wheel decreases the travelling stability of the aircraft.

An objective of the present invention is to provide a steering control apparatus for an aircraft that can increase the travelling stability of an aircraft.

Solution to Problem

A steering control apparatus for an aircraft according to the present embodiment controls a steering apparatus, the steering apparatus being capable of deflecting a steered wheel of landing gear of an aircraft and including: an actual steering angle detecting apparatus that detects an actual steering amount of the steered wheel; steering gear including a steering member and an operation amount detecting apparatus that detects an operation amount of the steering member; and a driving apparatus that deflects the steered wheel. The steering control apparatus includes an actual steering angle determining section, a target steering angle determining section, a target angle setting section, and a control state switching section. The actual steering angle determining section determines an actual steering angle of the steered wheel based on the actual steering amount. The target steering angle determining section determines a target steering angle based on the operation amount of the steering gear. The target angle setting section sets a target angle of the steered wheel. The control state switching section switches between an enabled state in which steering control is performed to deflect the steered wheel such that the actual steering angle reaches the target angle and a disabled state in which the steering control is not performed. The target angle setting section sets the target angle to an angle that is brought closer to the actual steering angle from the target steering angle when switching from the disabled state to the enabled state is performed by the control state switching section, and after switching from the disabled state to the enabled state, the target angle setting section brings the target angle closer to the target steering angle as time passes.

Advantageous Effects of Invention

A steering control apparatus for an aircraft according to the present invention can increase the travelling stability of an aircraft.

DESCRIPTION OF EMBODIMENTS

Figure 1:
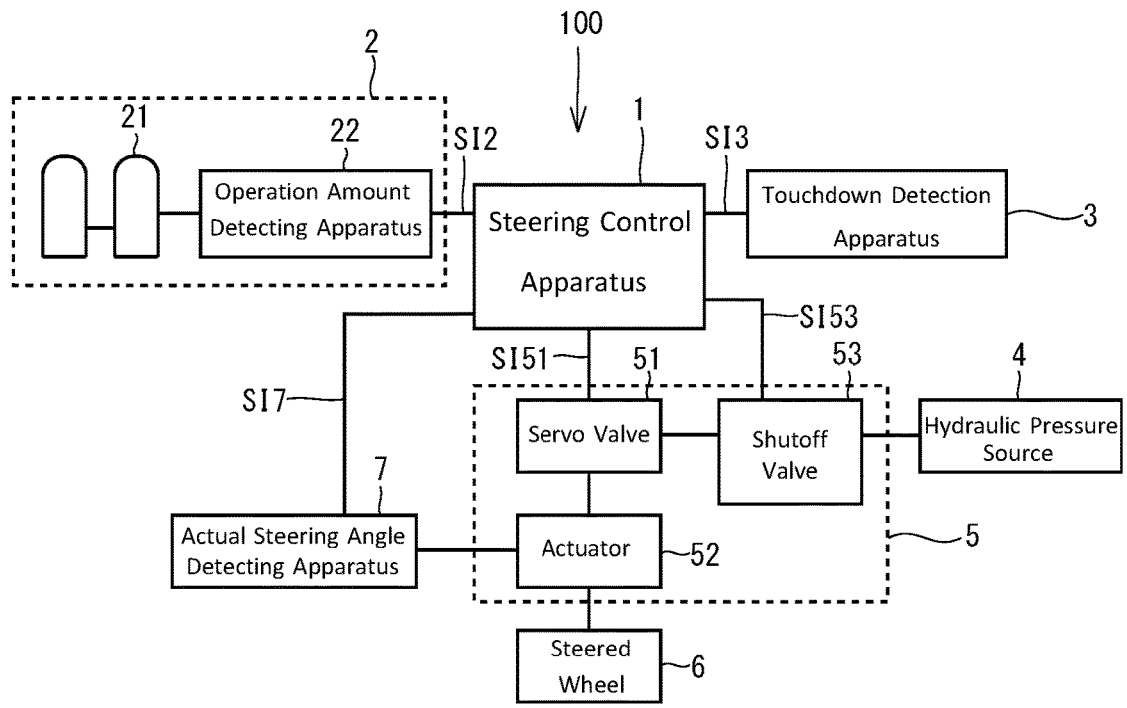
FIG. 1 is a functional block diagram of a steering control apparatus and a steering apparatus according to a first embodiment.

A steering control apparatus for an aircraft according to the present embodiment controls a steering apparatus, the steering apparatus being capable of deflecting a steered wheel of landing gear of an aircraft and including: an actual steering angle detecting apparatus that detects an actual steering amount of the steered wheel; steering gear including a steering member and an operation amount detecting apparatus that detects an operation amount of the steering member; and a driving apparatus that deflects the steered wheel. The steering control apparatus includes an actual steering angle determining section, a target steering angle determining section, a target angle setting section, and a control state switching section. The actual steering angle determining section determines an actual steering angle of the steered wheel based on the actual steering amount. The target steering angle determining section determines a target steering angle based on the operation amount of the steering gear. The target angle setting section sets a target angle of the steered wheel. The control state switching section switches between an enabled state in which steering control is performed to deflect the steered wheel such that the actual steering angle reaches the target angle and a disabled state in which the steering control is not performed. The target angle setting section sets the target angle to an angle that is brought closer to the actual steering angle from the target steering angle when switching from the disabled state to the enabled state is performed by the control state switching section, and after switching from the disabled state to the enabled state, the target angle setting section brings the target angle closer to the target steering angle as time passes.

The steering control apparatus according to the present embodiment determines that an aircraft has touched down when a sufficient time period has passed after the steered wheel touches down, and then enables steering control. At such time, the steering control apparatus does not deflect the steered wheel by taking a target steering angle that is determined based on the operation amount of the steering gear as a target angle, but instead deflects the steered wheel by taking an angle that has been brought closer to the actual steering angle from the target steering angle as the target angle. Further, the target angle is brought closer to the target steering angle as time passes. Thus, prior to controlling the steered wheel deflection with the target steering angle (hereunder, referred to as "normal control"), the steering control apparatus of the present embodiment performs controlling the steered wheel deflection with a target angle (hereunder, referred to as "transient control"). By this means, even if an actual steering angle ASA deviates by a large amount from a target steering angle TSA at the start of taxiing, the occurrence of a situation in which the steered wheel operates abruptly can be suppressed. As a result, the travelling stability of the aircraft can be improved.

The aforementioned target angle setting section may bring the target angle closer to the target steering angle in a manner such that a change amount per unit time in the target angle after switching from the disabled state to the enabled state is less than a maximum change amount per unit time in the actual steering angle that can be realized by the driving apparatus.

In this case, the occurrence of an abrupt movement of the steered wheel can be further suppressed.

When the target steering angle changes in a direction away from the target angle with a change amount per unit time that is greater than a change amount per unit time in the target angle, the target angle setting section may bring the target angle closer to the target steering angle in a manner such that the change amount per unit time in the target angle is equal to or greater than the change amount per unit time in the target steering angle.

In transient control, in some cases it is desired to intentionally operate the steered wheel abruptly by means of an operation performed by the pilot or the like. In a case where such an exceptional motion occurs, the target angle setting section changes the target angle with a change amount that is equal to or greater than the change amount per unit time of the target steering angle. Therefore, the driving apparatus deflects the steered wheel using a change amount that is equal to or greater than the change amount per unit time in the target steering angle. As a result, when an exceptional motion occurs, the steered wheel can be abruptly operated in accordance with an operation of a pilot or the like.

The aforementioned target angle setting section may bring the target angle closer to the target steering angle in a manner such that a difference between the target steering angle and the target angle decreases with passage of time.

In this case, while transient control is being executed, even if a pilot or the like operates the steering member to make the target steering angle deviate by a large amount from the target angle, the target angle is set such that the difference with respect to the target steering angle decreases as time passes. Therefore, even if the target steering angle fluctuates by a large amount during transient control, the change amount in the target angle increases or decreases in conformity with the change in the target steering angle, and thus the transient control ends within a predetermined time period.

The aforementioned target angle setting section may set the target angle to the actual steering angle when switching from the disabled state to the enabled state is performed by the control state switching section.

In this case, when the steered wheel touches down and taxiing starts and the steering control is enabled, the occurrence of a situation in which the steered wheel abruptly operates can be further suppressed.

Hereunder, embodiments of the present invention are described in detail with reference to the accompanying drawings. In the drawings, the same reference symbols are assigned to the same or equivalent elements, and the explanation thereof is not duplicated.

First Embodiment

[Overall Configuration of Steering Apparatus]

FIG. 1 is a functional block diagram illustrating the overall configuration of a steering apparatus of the present embodiment. Referring to FIG. 1, a steering apparatus 100 is capable of deflecting a steered wheel 6 of landing gear of an aircraft.

The steering apparatus 100 includes a steering control apparatus 1, steering gear 2, a driving apparatus 5, and an actual steering angle detecting apparatus 7.

The steering gear 2 is operated by an operator such as a pilot or a worker (hereunder, referred to as "pilot or the like"), and outputs a signal that corresponds to the operation amount. The steering gear 2 includes a steering member 21 and an operation amount detecting apparatus 22. The steering member 21 is a member that the pilot or the like operates for steering, and for example is a rudder pedal. The operation amount detecting apparatus 22 detects an operation amount of the steering member 21 that is operated by the pilot or the like. The operation amount detecting apparatus 22 also outputs a signal (hereunder, referred to as "operation amount signal") SI2 that corresponds to the detected operation amount to the steering control apparatus 1.

A touchdown detection apparatus 3 is connected to the steering apparatus 100. The touchdown detection apparatus 3 detects whether or not the steered wheel 6 has touched down. For example, when an external force that is equal to or greater than a reference value is applied to the steered wheel 6 (that is, when the steered wheel 6 is contacting the ground), the touchdown detection apparatus 3 outputs a WOW (weight on wheel) signal SI3 that is at a high level (H level) to the steering control apparatus 1. On the other hand, when an external force that is applied to the steered wheel 6 is less than the reference value (that is, when the aircraft is in flight), the touchdown detection apparatus 3 outputs the WOW signal SI3 that is at a low level (L level) to the steering control apparatus 1. The touchdown detection apparatus 3 may be configured to directly change the level of the WOW signal SI3 based on an external force, or may be configured to change the level of the WOW signal SI3 based on a mechanical change caused by an external force in a leg structure member that includes the steered wheel.

A hydraulic pressure source 4 is connected to the steering apparatus 100. The hydraulic pressure source 4 supplies pressurized hydraulic oil to the driving apparatus 5. The hydraulic pressure source 4 also recovers hydraulic oil that is discharged from the driving apparatus 5. In short, the hydraulic pressure source 4 circulates hydraulic oil within the driving apparatus 5.

The driving apparatus 5 deflects the steered wheel 6 in accordance with an instruction from the steering control apparatus 1. The configuration of the driving apparatus 5 is not particularly limited as long as the driving apparatus 5 can deflect the steered wheel 6 in accordance with an instruction from the steering control apparatus 1. In FIG. 1, the driving apparatus 5 includes a servo valve 51, an actuator 52 and a shutoff valve 53.

The shutoff valve 53 is disposed between the hydraulic pressure source 4 and the servo valve 51, and is connected to the hydraulic pressure source 4 and the servo valve 51. In accordance with a control command SI53 from the steering control apparatus 1, the shutoff valve 53 allows or stops an inflow of pressurized hydraulic oil from the hydraulic pressure source 4 into the driving apparatus 5. When the shutoff valve 53 is open, pressurized hydraulic oil is supplied to the servo valve 51. Accordingly, the driving apparatus 5 is in a control-enabled state. When the shutoff valve 53 is closed, the inflow of hydraulic oil from the hydraulic pressure source 4 is stopped and, furthermore, a circular flow of hydraulic oil is formed within the actuator 52. Accordingly, the driving apparatus 5 is in a control-stopped state, and the steering apparatus 100 enters a free-caster state in which the actuator 52 can be freely moved together with the steered wheel 6 by an external force that is applied to the steered wheel 6.

The servo valve 51 is disposed between the shutoff valve 53 and the actuator 52 and is connected to the shutoff valve 53 and the actuator 52. When the shutoff valve 53 is open, the servo valve 51 receives pressurized hydraulic oil from the hydraulic pressure source 4 via the shutoff valve 53, and continuously actuates the actuator 52 by regulating the amount of hydraulic oil that is supplied to the actuator 52 in accordance with a control command SI51 from the steering control apparatus 1.

The actuator 52 is disposed between the steered wheel 6 and the servo valve 51, and is connected to the steered wheel 6 and the servo valve 51. The actuator 52 mechanically deflects the steered wheel 6 by means of the pressure of hydraulic oil that is supplied through the servo valve 51.

The actual steering angle detecting apparatus 7 detects the actual steering amount of the steered wheel 6. In the present example, the actual steering angle detecting apparatus 7 detects a stroke amount of the actuator 52 of the driving apparatus 5 as the actual steering amount. The actual steering angle detecting apparatus 7 outputs an actual steering amount signal SI7 to the steering control apparatus 1.

[Configuration of Steering Control Apparatus 1]

Figure 2:
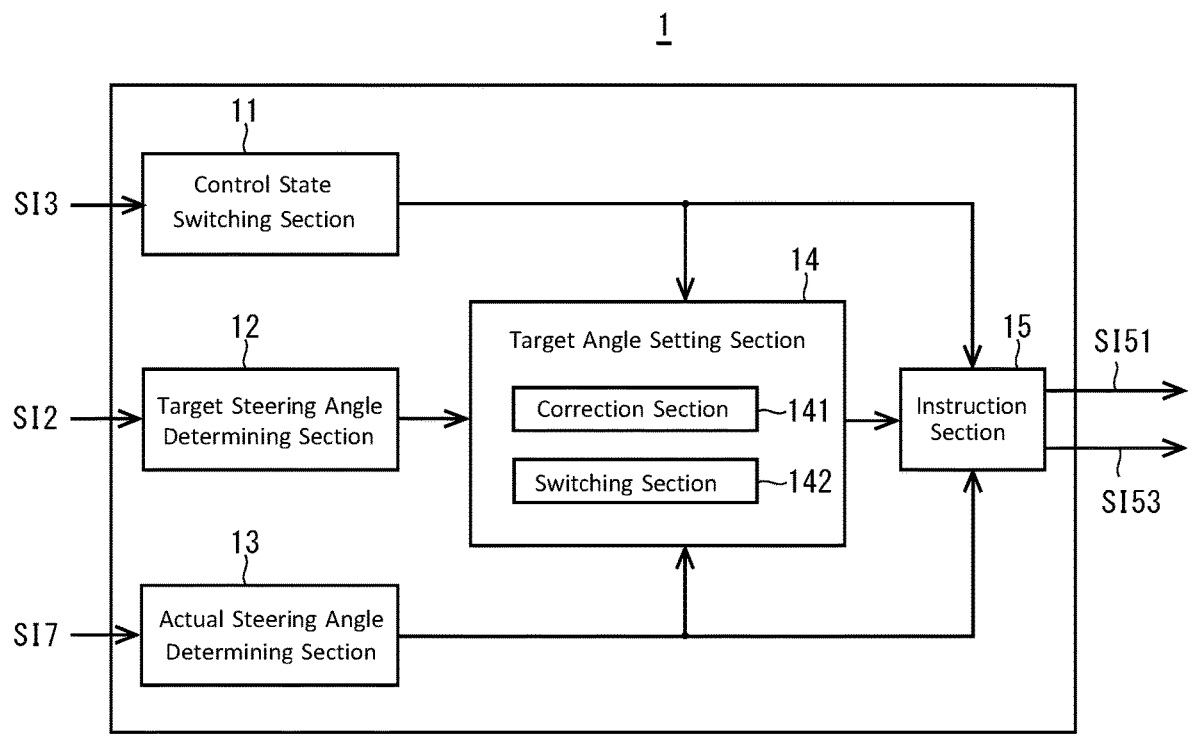
FIG. 2 is a functional block diagram of the steering control apparatus in FIG. 1.

The steering control apparatus 1 of the present embodiment controls the driving apparatus 5 to adjust an actual steering angle ASA of the steered wheel 6. FIG. 2 is a functional block diagram of the steering control apparatus 1. Referring to FIG. 2, the steering control apparatus 1 includes a control state switching section 11, a target steering angle determining section 12, an actual steering angle determining section 13, a target angle setting section 14 and an instruction section 15.

The control state switching section 11 receives the WOW signal SI3 that is output from the touchdown detection apparatus 3, and determines whether the steered wheel 6 has touched down and is in a stable taxiing state. If it is determined that the steered wheel 6 is in a stable taxiing state, the control state switching section 11 switches the steering control to the enabled state. If it is determined that the steered wheel 6 is not in a stable taxiing state, the control state switching section 11 switches the steering control to the disabled state.

The target steering angle determining section 12 receives an operation amount signal SI2 that is output from the steering gear 2, and determines a target steering angle TSA. The target steering angle determining section 12, for example, stores a target steering angle table in which angles that are associated with operation amounts are registered. At each predetermined time interval (each time that steering control processing that is described later is executed), the target steering angle determining section 12 determines an angle that is associated with the received operation amount signal SI2 based on the target steering angle table and stores the thus-determined angle as the target steering angle TSA.

The actual steering angle determining section 13 receives the actual steering amount signal SI7 that is output from the actual steering angle detecting apparatus 7, and determines an actual steering angle ASA. The actual steering angle determining section 13, for example, stores an actual steering angle table in which angles that are associated with actual steering amounts (in the present example, stroke amounts of the actuator 52) are registered. At each predetermined time interval (each time that steering control processing that is described later is executed), the actual steering angle determining section 13 determines an angle that is associated with the received actual steering amount signal based on the actual steering angle table to be the actual steering angle ASA, and stores the thus-determined actual steering angle ASA.

The target angle setting section 14 sets the target angle TA of the steered wheel 6. The target angle setting section 14 includes a correction section 141 and a switching section 142.

The correction section 141 of the target angle setting section 14 determines the target angle TA during transient control. The transient control is started, at the latest, by the time the steering control is placed in the enabled state. The correction section 141 makes the target angle TA a value that is brought closer to the actual steering angle ASA from the target steering angle TSA by the time point at which the steering control is placed in the enabled state. In the present example, the correction section 141 sets the target angle TA to match the actual steering angle ASA. The correction section 141 also brings the target angle TA closer to the target steering angle TSA as time passes after the steering control has been enabled. Specifically, each time target angle update processing S20 that is described later is executed, the correction section 141 updates the target angle TA to bring the target angle TA closer to the target steering angle TSA.

The switching section 142 of the target angle setting section 14 switches between transient control and normal control. The switching section 142 starts the transient control (determination of the target angle TA by the correction section 141) by, at the latest, the time point at which the steering control is enabled, and after the steering control has been enabled, the switching section 142 stops the transient control (determination of the target angle TA by the correction section 141) when the target angle TA arrives at the target steering angle TSA, and thereafter the switching section 142 updates the target angle TA using the value of the target steering angle TSA during the period in which the steering control is enabled (normal control). The statement "the target angle TA arrives at the target steering angle TSA" herein means that a difference between the target steering angle TSA and the target angle TA has become less than a reference value, or that the target angle TA has passed the target steering angle TSA. In other words, even in a case where the target angle TA does not strictly match the target steering angle TSA, the target angle TA is regarded as having arrived at the target steering angle TSA if the target angle TA is a value that is close to the target steering angle TSA When the control state switching section 11 switches the steering control to the enabled state, the instruction section 15 outputs, to the driving apparatus 5, a control command SI53 such that the shutoff valve 53 opens, and a control command SI51 for controlling the servo valve 51 so as to deflect the steered wheel 6 until the actual steering angle ASA of the steered wheel 6 reaches the target angle TA. When the control state switching section 11 switches the steering control to the disabled state, the instruction section 15 outputs, to the driving apparatus 5, a control command SI53 such that the shutoff valve 53 closes, and a control command SI51 such that the servo valve 51 moves to a neutral position.

[Overview of Operations of Steering Control Apparatus 1 of Present Embodiment]

An overview of the operations of the steering control apparatus 1 having the above described configuration will now be described.

Figure 3:
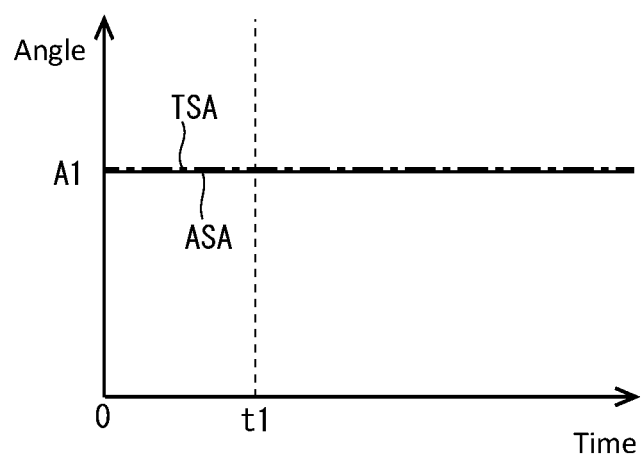
FIG. 3 is a view illustrating changes in a target steering angle and an actual steering angle with the passage of time in a conventional steering control apparatus.

First, the operations of a conventional steering control apparatus will be described. FIG. 3 is a view illustrating the movements in the target steering angle TSA and the actual steering angle ASA over the passage of time in a conventional steering control apparatus. The dashed line in FIG. 3 represents the target steering angle TSA, and the solid line represents the actual steering angle ASA. Referring to FIG. 3, it is assumed that, after the steered wheel 6 touches down and taxiing is started, the steering control enters an enabled state at a time t1. In FIG. 3, while the aircraft is flying and until the steering control enters the enabled state after the steered wheel 6 touches down, the target steering angle TSA and the actual steering angle ASA of the steered wheel are substantially matching. After the steering control state changes into the enabled state at the time t1, the steering control apparatus deflects the steered wheel 6 such that the actual steering angle ASA reaches the target steering angle TSA. Therefore, from the time t1 onward also, the target steering angle TSA substantially matches the actual steering angle ASA of the steered wheel. From the time t1 onward, for example, in a case where the target steering angle TSA increases with the passage of time as a result of the pilot operating the steering member 21, the actual steering angle ASA also increases to track the target steering angle TSA.

Figure 4:
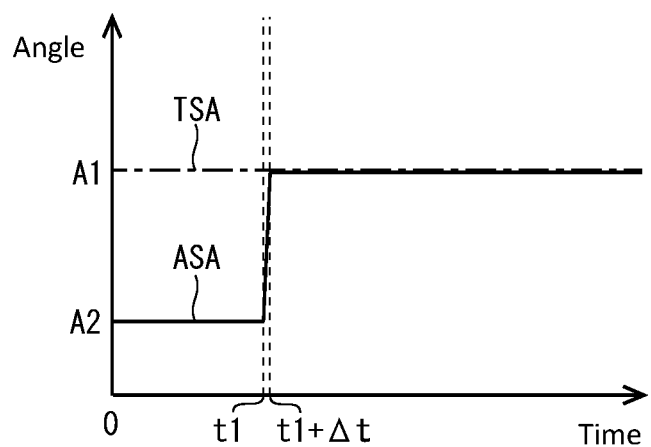
FIG. 4 is a view illustrating changes in a target steering angle and an actual steering angle with the passage of time in a conventional steering control apparatus, which is different from FIG. 3.

However, in the case of the conventional steering control apparatus, the following problem arises. As illustrated in FIG. 4, a case will be assumed in which, when the steering control enters the enabled state at the time t1, the actual steering angle ASA differs by a large amount from the target steering angle TSA due to some cause or other. For example, it will be assumed that when the aircraft lands in a state in which the target steering angle TSA and the actual steering angle ASA had both been at a neutral position (a state in which steering is not performed) while the aircraft was in flight, the longitudinal direction of the aircraft deviates from the travelling direction due to the influence of crosswinds or the like. At such time, upon the steered wheel 6 touching down, the orientation of the steered wheel 6 becomes the travelling direction, and the actual steering angle ASA deviates from the neutral position, and there is the possibility that the actual steering angle ASA will differ by a large amount from the target steering angle TSA. In this case, after the time t1, the steering control apparatus deflects the steered wheel so as to bring the actual steering angle ASA to the target steering angle TSA. As illustrated in FIG. 4, at the time t1, the actual steering angle ASA is A2°, and thus the actual steering angle ASA deviates by a large amount from A1° that is the target steering angle TSA. Therefore, the steering control apparatus instructs the driving apparatus so as to deflect the steered wheel 6 with the maximum change amount per unit time that the driving apparatus is capable of realizing. As a result, as illustrated in FIG. 4, in a short time period Δt from the time t1, the steering control apparatus abruptly moves the steered wheel to match the actual steering angle ASA with the target steering angle TSA. In this case, because the steered wheel abruptly moves, the travelling stability of the aircraft decreases.

In this regard, prior to performing normal control using the target steering angle TSA as a target angle TA, the steering control apparatus 1 of the present embodiment executes transient control using a target angle TA that has been brought closer to the actual steering angle ASA. By this means, an abrupt movement of the steered wheel that is caused by a difference between the target steering angle TSA and the actual steering angle ASA being large as described above can be suppressed. This point is described hereunder.

Figure 5:
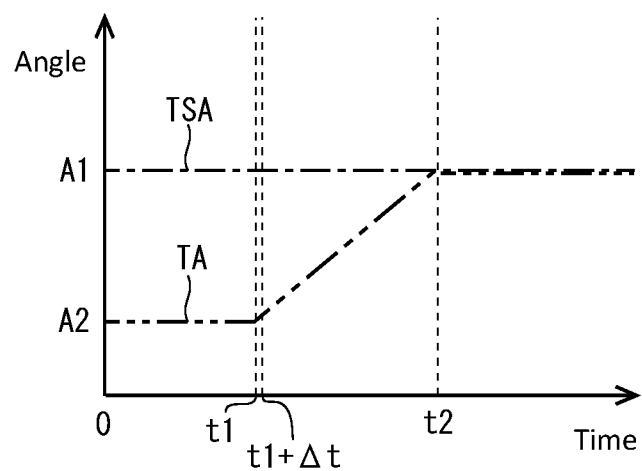
FIG. 5 is a view illustrating changes in a target steering angle and a target angle with the passage of time in a steering control apparatus of the present embodiment.
Figure 6:
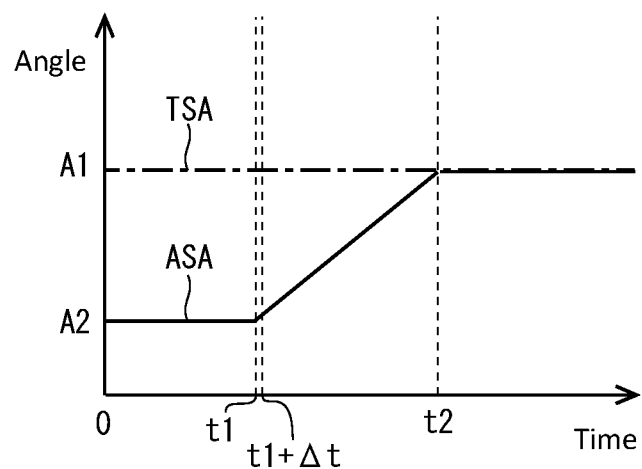
FIG. 6 is a view illustrating changes in a target steering angle and an actual steering angle with the passage of time that corresponds to FIG. 5.

FIG. 5 is a view for describing operations of the steering control apparatus 1 in the present embodiment. FIG. 6 is a view illustrating the relation between the actual steering angle ASA and the target steering angle TSA during the operations shown in FIG. 5. It is assumed that, in both FIG. 5 and FIG. 6, the steering control enters the enabled state at a time t1.

The steering control apparatus 1 makes the target angle TA an angle that has been brought closer to the actual steering angle ASA from the target steering angle TSA by, at the latest, the time t1, and repeats the processing in question until reaching the time t1 (chain double-dashed line in FIG. 5). In FIG. 5, the steering control apparatus 1 makes the target angle TA the same value as the actual steering angle ASA (A2°).

The steering control apparatus 1 also brings the target angle TA closer to the target steering angle TSA with the passage of time after the time t1 (see FIG. 5). As a result, the actual steering angle ASA approaches the target steering angle TSA by tracking the target angle TA that increases with the passage of time (see FIG. 6).

When the steering control enters the enabled state at the time t1, as illustrated in FIG. 6, the actual steering angle ASA deviates by a large amount from the target steering angle TSA. However, as illustrated in FIG. 5 and FIG. 6, the steering control apparatus 1 deflects the steered wheel 6 such that the actual steering angle ASA tracks the target angle TA that was brought closer to the actual steering angle ASA, instead of the target steering angle TSA (execution of transient control). Therefore, the occurrence of a situation in which the motion of the steered wheel 6 abruptly changes immediately after the time t1, as illustrated in FIG. 4, can be suppressed.

Referring to FIG. 5, as a result of the target angle TA being brought closer to the target steering angle TSA with the passage of time, the target angle TA arrives at the target steering angle TSA at a time t2. At such time, the steering control apparatus 1 switches to normal control that uses the target steering angle TSA as the target angle TA, and thereafter deflects the steered wheel 6 such that the actual steering angle ASA tracks the target steering angle TSA.

As described above, the steering control apparatus 1 of the present embodiment sets a target angle TA that has been brought closer to the actual steering angle ASA from the target steering angle TSA, and performs transient control using the target angle TA when steering control starts after the aircraft touches down. Subsequently, when the target angle TA arrives at the target steering angle TSA, the steering control apparatus 1 performs normal control that uses the target steering angle TSA as the target angle TA. By performing the transient control, the occurrence of a situation in which the steered wheel 6 abruptly operates can be suppressed. Consequently, the taxiing stability of the aircraft after the aircraft touches down can be enhanced. Hereunder, the operations of the steering control apparatus 1 are described in detail using flowcharts. In the following description, with respect to the deflection of the steered wheel 6, the actual steering angle ASA in a case where the longitudinal direction of the aircraft and the direction of the steered wheel are matching is assumed to be 0°. Further, a clockwise rotation direction when the steered wheel 6 is seen from above is represented by plus (+), and a counter-clockwise rotation direction is represented by minus (−).

[Operations of Steering Control Apparatus 1]

Figure 7:
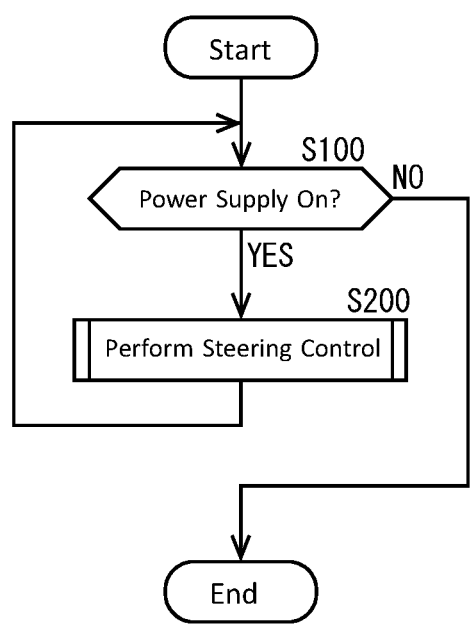
FIG. 7 is an overall flowchart illustrating the operations of the steering control of the present embodiment.

FIG. 7 is an overall flowchart that illustrates an overview of steering control from a time when the aircraft is making its approach in preparation for touch down until the aircraft lands and taxis and the flight ends. In FIG. 7, processing that does not influence the present invention is omitted. When the power supply of the steering control apparatus 1 is on (Yes in S100), the steering control apparatus 1 executes steering control processing (S200). In the present embodiment, it is assumed that the power supply of the steering control apparatus 1 is always on during the flight operations.

Therefore, the steering control apparatus 1 repeatedly executes the steering control processing (S200) until the flight operations end and the power supply of the steering control apparatus 1 is turned off.

[Steering Control Processing (S200)]

Figure 8:
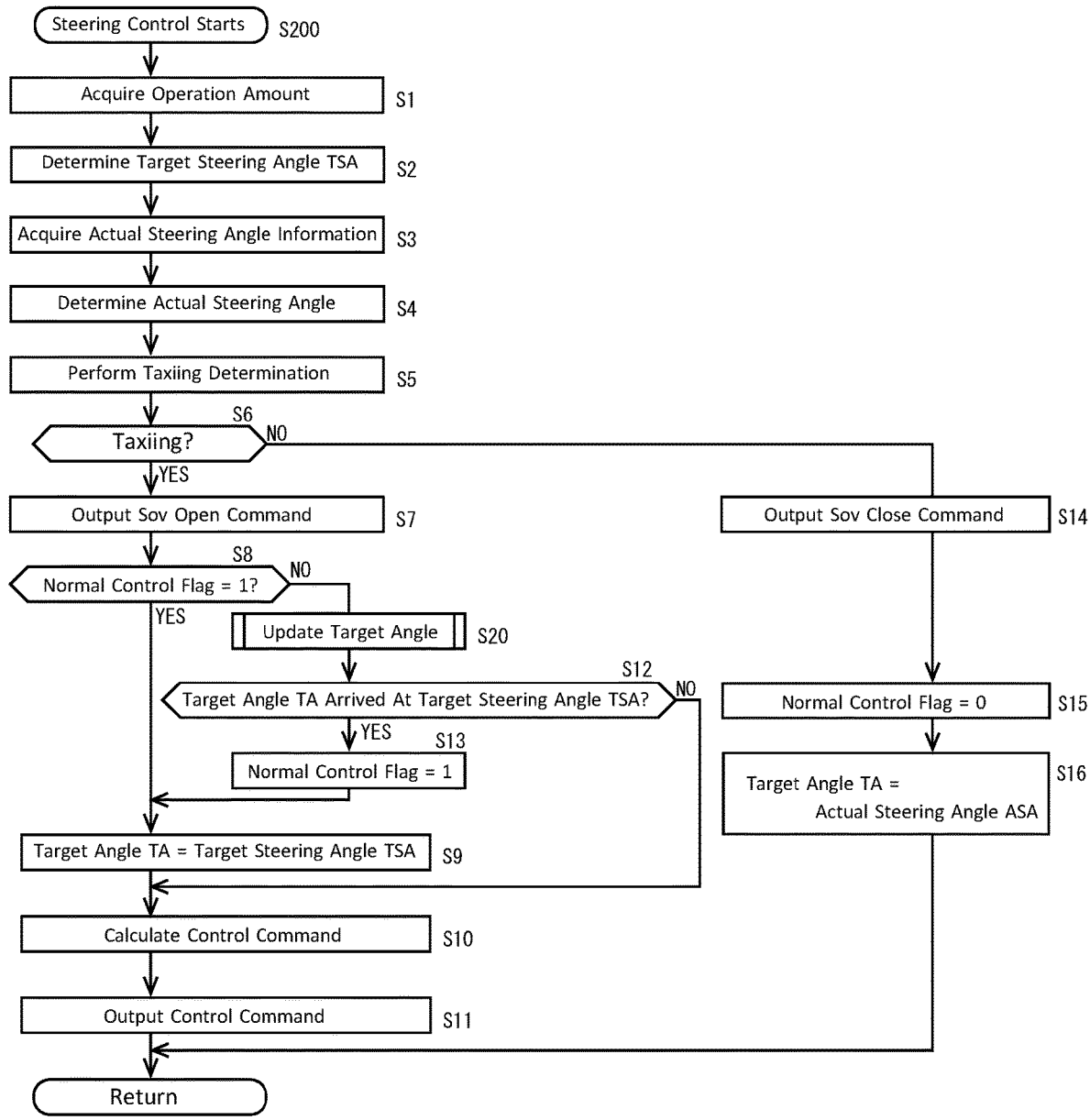
FIG. 8 is a flowchart illustrating the details of steering control processing in FIG. 7.

FIG. 8 is a flowchart illustrating the steering control processing (S200).

[Operations Until the Steering Control State Changes into the Enabled State (Operations Until Time t1)]

In the steering control processing (S200), firstly, the target steering angle determining section 12 inside the steering control apparatus 1 determines the target steering angle TSA (S1 and S2), and the actual steering angle determining section 13 determines the actual steering angle ASA (S3 and S4). Specifically, the target steering angle determining section 12 acquires the operation amount signal SI2 from the steering gear 2 (S1). The target steering angle determining section 12 determines the target steering angle TSA based on the operation amount signal SI2 (S2). Likewise, the actual steering angle determining section 13 acquires the actual steering amount signal 517 from the actual steering angle detecting apparatus 7 (S3), and determines the actual steering angle ASA based on the actual steering amount signal SI7 (S4).

The steering control apparatus 1 also determines whether or not the steered wheel 6 has landed on the ground and is performing stable taxiing (S5 and S6). Specifically, in a case where the control state switching section 11 acquires the WOW signal SI3, and the WOW signal SI3 is continuously at H level for a predetermined time period, the control state switching section 11 determines that the steered wheel 6 has landed on the ground and is performing stable taxiing, and switches the steering control to the enabled state. In cases other than the foregoing case, the control state switching section 11 switches the steering control to the disabled state. Note that, although in the present embodiment a determination regarding taxiing is made depending on the WOW signal SI3, a signal to be utilized to determine stable taxiing is not limited to the WOW signal SI3. For example, another signal such as an aircraft speed signal may be utilized to make a determination with respect to taxiing. Further, a determination with respect to taxiing may be made utilizing a combination of a plurality of signals such as the WOW signal SI3 and an aircraft speed signal.

If the aircraft is in flight, because the WOW signal SI3 is at L level, the control state switching section 11 determines that the steered wheel 6 is not landed on the ground and performing stable taxiing, and switches the steering control to the disabled state (No in S6). In this case, as the control command SI53, the instruction section 15 outputs an instruction to close the valve (SOV close command) to the shutoff valve 53 inside the driving apparatus 5 (S14). Upon receiving the SOV close command, the shutoff valve 53 places the valve in a closed state. As a result, pressurized hydraulic oil is not supplied to the inside of the driving apparatus 5, and the driving apparatus 5 enters a control-stopped state. In this case, the steered wheel 6 is not controlled by the driving apparatus 5, and is in a free-caster state in which the steered wheel 6 can freely deflect if the steered wheel 6 receives an external force. Note that, if the steering control has already been switched to the disabled state by the previous processing in step S6, the control state switching section 11 maintains the disabled state.

After step S14, the target angle setting section 14 sets a normal control flag to "0" (S15). In this case the normal control flag is a flag that indicates whether the steering control apparatus 1 is performing normal control or performing transient control. When the normal control flag is "0", it means that the steering control apparatus 1 is performing transient control. When the normal control flag is "1", it means that the steering control apparatus 1 is performing normal control.

After the normal control flag is set to "0", the correction section 141 inside the target angle setting section 14 makes the target angle TA the same value (A2° in FIG. 5) as the actual steering angle ASA (S16). In the steering control processing (S200), the processing in question is repeatedly executed until reaching the time t1. By this means, at the time t1, the target angle TA matches the actual steering angle ASA.

[Operations from Time that the Steering Control State Changes into the Enabled State (Operations from Time t1 Onward)]

As a result of repeatedly executing the steering control processing (S200), at the time t1 the control state switching section 11 determines that the steered wheel 6 has touched down and is stably taxiing, and switches the steering control to the enabled state (Yes in SE). At this time, the instruction section 15 places the driving apparatus 5 in a control-enabled state (S7). Specifically, as the control command SI53, the instruction section 15 outputs an instruction for opening the valve (SOV open command) to the shutoff valve 53 inside the driving apparatus 5 (S7). At this time, upon receiving the SOY open command, the shutoff valve 53 places the valve in an open state. As a result, pressurized hydraulic oil is supplied into the driving apparatus 5, and the driving apparatus 5 enters a state (control-enabled state) in which the driving apparatus 5 is capable of deflecting the steered wheel 6.

Next, the target angle setting section 14 checks the normal control flag (S8). At the time t1, because the normal control flag is "0" (No in S8), the target angle setting section 14 recognizes that the control at the current time is the transient control. Therefore, the target angle setting section 14 executes target angle update processing and updates the target angle TA (S20).

[Target Angle Update Processing (S20)]

Figure 9:
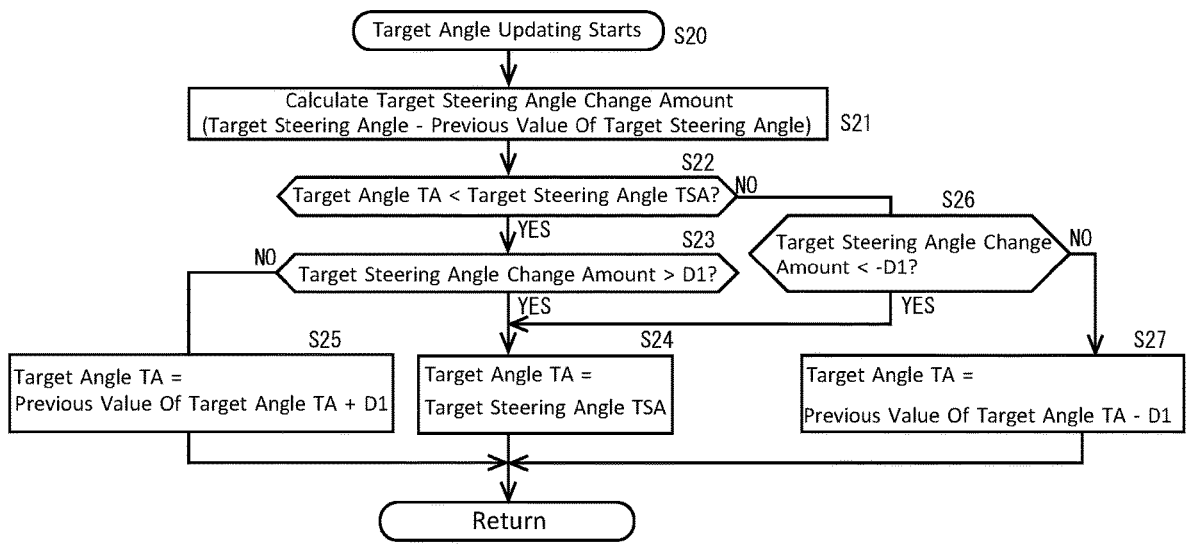
FIG. 9 is a flowchart illustrating the details of target angle update processing in FIG. 8.

FIG. 9 is a flowchart illustrating the target angle update processing (S20) shown in FIG. 8. In the target angle update processing (S20), the correction section 141 of the target angle setting section 14 brings the target angle TA closer to the target steering angle TSA as time passes.

Specifically, first the correction section 141 calculates a target steering angle change amount based on the following equation (S21).

Target steering angle change amount=target steering angle TSA−target steering angle TSA determined by previous steering control processing Next, the correction section 141 compares the target angle TA and the target steering angle TSA (S22). If the target angle TA is smaller than the target steering angle TS A (Yes in S22), and the target steering angle change amount calculated in step S21 is equal to or less than a predetermined positive change amount "Δ1" per unit time (in the present example, per calculation cycle) for a target angle TA (No in S23), the correction section 141 updates the target angle TA in the manner shown by the following equation (S25).

Target angle TA=target angle TA set in previous steering control processing+Δ1

On the other hand, if the result of the comparison in step S22 shows that the target angle TA is equal to or greater than the target steering angle TSA (No in S22), and the target steering angle change amount is equal to or greater than a predetermined negative change amount "−Δ1" per unit time for a target angle (No in S26), the correction section 141 updates the target angle TA in the manner shown by the following equation (S27).

Target angle TA=target angle TA set in previous steering control processing−Δ1

In short, as time passes from the time t1 (each time the target angle update processing (S20) is executed), the correction section 141 updates the target angle TA and changes the target angle TA in the direction of the target steering angle TSA by an amount corresponding to the change amount Δ1 per unit time.

Returning to FIG. 8, after updating the target angle TA by performing the target angle update processing (S20), the switching section 142 of the target angle setting section 14 determines whether or not the updated target angle TA has arrived at the target steering angle TSA (S12). As described above, in step S12, the target angle TA is regarded as having arrived at the target steering angle TSA if a difference between the target angle TA and the target steering angle TSA is equal to or less than a reference value or if the target angle TA has passed the target steering angle TSA.

In step S12, if the target angle TA has not arrived at the target steering angle TSA (No in S12), the steering control apparatus 1 continues the transient control (normal control flag remains "0").

The instruction section 15 calculates the control command SI51 so as to deflect the steered wheel 6 such that the actual steering angle ASA reaches the target angle TA (in this case, the target angle TA for the transient control that was set in S20) (S10). The instruction section 15 then outputs the calculated control command SI51 to (the servo valve 51 of) the driving apparatus 5 (S11).

Upon receiving the control command SI51, the driving apparatus 5 drives the servo valve 51. As a result, the steered wheel 6 operates and the actual steering angle ASA approaches the target angle TA for the transient control.

After executing step S11, as long as the power supply is turned on (Yes in S100 in FIG. 7), the steering control apparatus 1 returns to step S1 and repeats the steering control processing (S200). By this means, as illustrated in FIG. 5 and FIG. 6, after the time t1, the target angle TA approaches the target steering angle TSA with the passage of time (see FIG. 5). As a result, the actual steering angle ASA approaches the target steering angle TSA (FIG. 6).

[Operations when Target Angle TA has Arrived at Target Steering Angle TSA (Operations from Time t2 Onward in FIG. 5)]

As a result of repeatedly executing the steering control processing (S200) from the time t1 onward in FIG. 5, at the time t2 the switching section 142 in the target angle setting section 14 determines that the target angle TA for the transient control arrived at the target steering angle TSA (Yes in S12 in FIG. 8). At this time, in order to execute normal control, the target angle setting section 14 sets the normal control flag to "1" (S13). In addition, the switching section 142 makes the target angle TA the same value as the target steering angle TSA instead of the value that was updated by the correction section 141 in the target angle setting section 14 (S9).

By means of the aforementioned operation, the steering control is switched from the transient control to the normal control. Thereafter, during the period in which the steering control processing (S200) is being executed, the steering control apparatus 1 repeatedly executes the normal control as long as the normal control flag is "1" (Yes in S8). The instruction section 15 calculates the control command SI51 (S10) so as to deflect the steered wheel 6 until the actual steering angle ASA reaches the target angle TA (the target steering angle TSA), and outputs the calculated control command SI51 to (the servo valve 51 of) the driving apparatus 5 (S11). The driving apparatus 5 deflects the steered wheel 6 based on the control command SI51 such that the actual steering angle ASA tracks the target angle TA (the target steering angle TSA).

By performing the above described operations, the steering control apparatus 1 sets the target angle TA to match the actual steering angle ASA until the steering control is placed in the enabled state (period until time t1 in FIG. 5). The steering control apparatus 1 then performs the transient control from the time t1, and thus changes the actual steering angle ASA using the target angle TA that is updated by the correction section 141 until the target angle TA arrives at the target steering angle TSA. When the target angle TA arrives at the target steering angle TSA at the time t2, the steering control apparatus 1 performs the normal control instead of the transient control, and thus changes the actual steering angle ASA using a target angle TA that is the same value as the target steering angle TSA. By this means, abrupt operations of the steered wheel 6 can be suppressed.

[Exceptional Motion During Initial Operation]

As described in the foregoing, the steering control apparatus 1 gradually brings the target angle TA for the transient control closer to the target steering angle TSA from the value of the actual steering angle ASA at the time t1 as time passes. By this means, an abrupt operation of the steered wheel 6 that is attributable to a large difference between the actual steering angle ASA and the target steering angle TSA at the time when the aircraft touches down is suppressed. However, during the transient control from the time t1 onward, in some cases the pilot may operate the steering member 21 to intentionally change the target steering angle TSA to move away from the target angle TA in the same direction as the direction of change in the target angle TA by a change amount that is at least greater than the change amount Δ1 per unit time in the target angle TA. In a case where such an exceptional motion occurs, if the target angle TA is being changed while the change amount per unit time (calculation cycle) remains constant during transient control, irrespective of the fact that the pilot intentionally requests an abrupt change, the deflection of the steered wheel 6 will not respond to the operation of the pilot and will remain slow.

The steering control apparatus 1 of the present embodiment also supports such an exceptional motion. Specifically, when the aforementioned exceptional motion occurs due to an operation by the pilot or the like, that is, in the target angle update processing (S20) in FIG. 9, if the target steering angle change amount that is calculated in step S21 is more than the predetermined positive change amount "Δ1" or negative change amount "−Δ1" per unit time for the target angle (Yes in S23 or Yes in S26), the switching section 142 in the target angle setting section 14 sets the target angle TA to the same value as the target steering angle TSA (S24). By this means, because the steering control apparatus 1 determines that the target angle TA arrived at the target steering angle TSA (Yes in S12 in FIG. 8), the steering control changes into the normal control, and after setting the normal control flag to "1", the steering control apparatus 1 outputs the control command SI51 such that the actual steering angle ASA tracks the target angle TA that is the same value as the target steering angle TSA (S9, S10 and S11 in FIG. 8). As a result, in a case where the aforementioned exceptional motion occurs due to an operation by the pilot or the like, the steered wheel 6 swiftly operates in accordance with the operation of the pilot or the like.

In step S24, although the target angle TA is made the target steering angle TSA, it suffices to bring the target angle TA closer to the target steering angle TSA such that the change amount per unit time in the target angle TA becomes equal to or greater than the aforementioned target steering angle change amount. Even in this case, the steered wheel 6 can swiftly operate in accordance with an operation of the pilot or the like.

Second Embodiment

In the first embodiment, in the target angle update processing (S20), the correction section 141 in the target angle setting section 14 changes the target angle TA in the direction of the target steering angle TSA by an amount corresponding to a change amount Δ1 per unit time that is constant as time passes (each time processing is executed), and in a case where the target steering angle TSA abruptly moves away from the target angle TA in the same direction as the direction of change of the target angle TA, the target angle TA is immediately set to the target steering angle TSA and the steering control switches to the normal control. However, the correction section 141 may update the target angle TA such that a difference between the target angle TA and the target steering angle TSA decreases with the passage of time (each time processing is executed), irrespective of the size of the change amount in the target steering angle TSA. Hereunder, a second embodiment is described.

Figure 10:
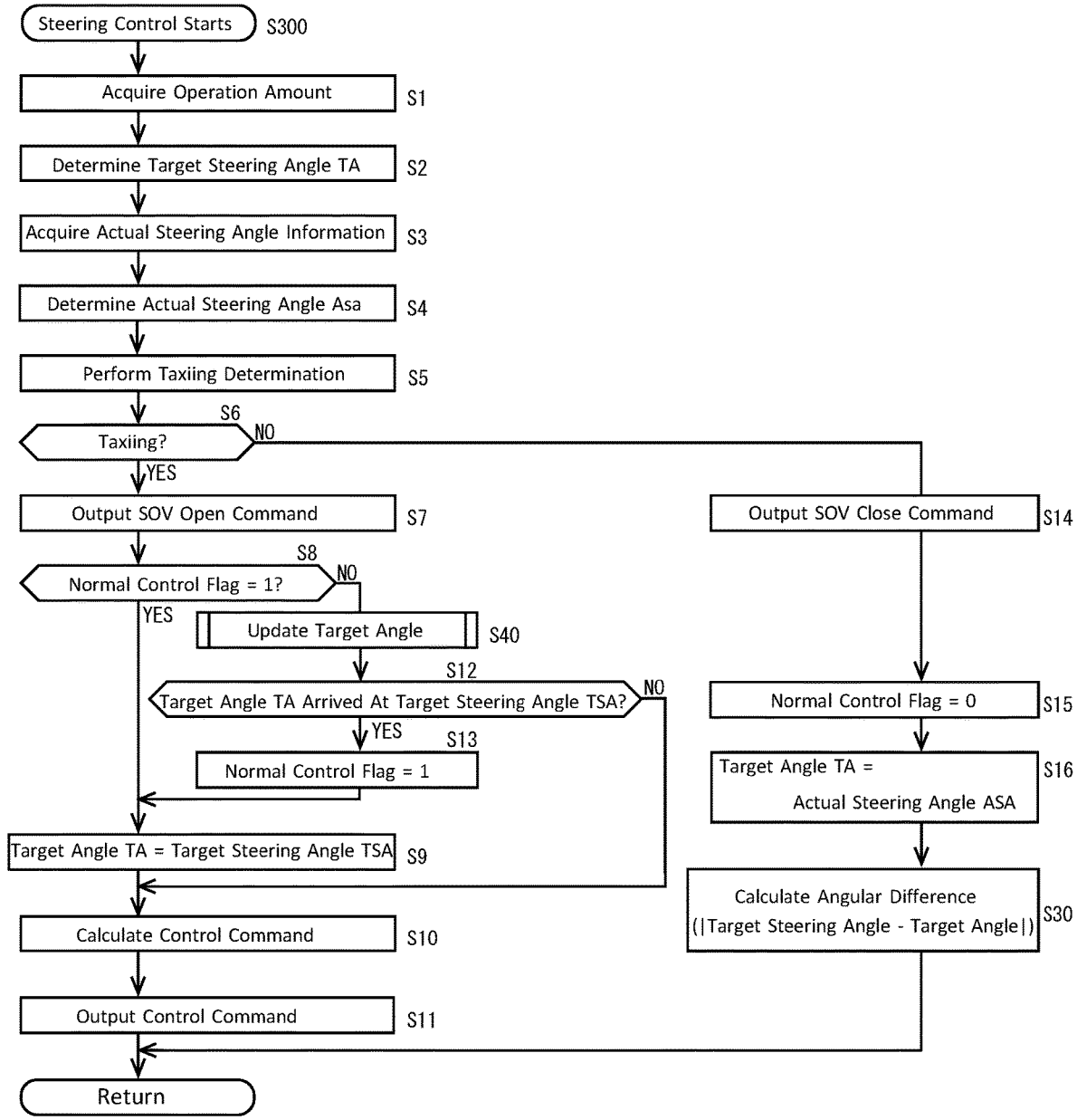
FIG. 10 is a flowchart illustrating the details of steering control processing according to a second embodiment.

The configuration of the steering control apparatus 1 of the second embodiment is the same as the first embodiment. FIG. 10 is a flowchart illustrating steering control processing (S300) executed by the steering control apparatus 1 of the second embodiment. Referring to FIG. 10, in comparison to the steering control processing (S200) of FIG. 8, in the steering control processing (S300), step S30 is executed after step S16. Furthermore, in the steering control processing (S300), target angle update processing (S40) is performed instead of target angle update processing (S20). The other operations performed according to the steering control processing (S300) are the same as in the steering control processing (S200). Hereunder, the operations of the steering control processing (S300) are described.

[Operations Until Steering Control State Changes into Enabled State (Operations Until Time t1)]

Referring to FIG. 10, the steering control apparatus 1 determines the target steering angle TSA (S1 and S2), and determines the actual steering angle ASA (S3 and S4). The steering control apparatus 1 also determines whether or not the steered wheel 6 has landed and is performing stable taxiing (S5 and S6). At a time that is prior to the time t1, the steered wheel 6 is not landed and performing stable taxiing (No in S6). Therefore, the steering control is in the disabled state, and the steering control apparatus 1 outputs the SOV close command (S14), and sets the normal control flag to "0" (S15). In addition, the target angle setting section 14 inside the steering control apparatus 1 sets the target angle TA to the same angle as the actual steering angle ASA (A2° in FIG. 5) (S16).

After the foregoing process, the target angle setting section 14 calculates the difference between the target steering angle TSA and the target angle TA by means of the following equation (S30).

Angular difference=|target steering angle TSA−target angle TA|

In short, the angular difference is the absolute difference between the target steering angle TSA and the target angle TA.

After the angular difference is calculated in step S30, the steering control apparatus 1 returns to step S1 and repeats the processing.

[Operations from Time that the Steering Control State Changes into the Enabled State (Operations from Time t1 Onward)]

At the time t1, it is determined by the control state switching section 11 that the steered wheel 6 has landed on the ground and stable taxiing has started (Yes in S6). At this time, in comparison with FIG. 8, instead of the target angle update processing (S20) illustrated in FIG. 9, the target angle setting section 14 performs target angle update processing (S40) that is illustrated in FIG. 11.

Figure 11:
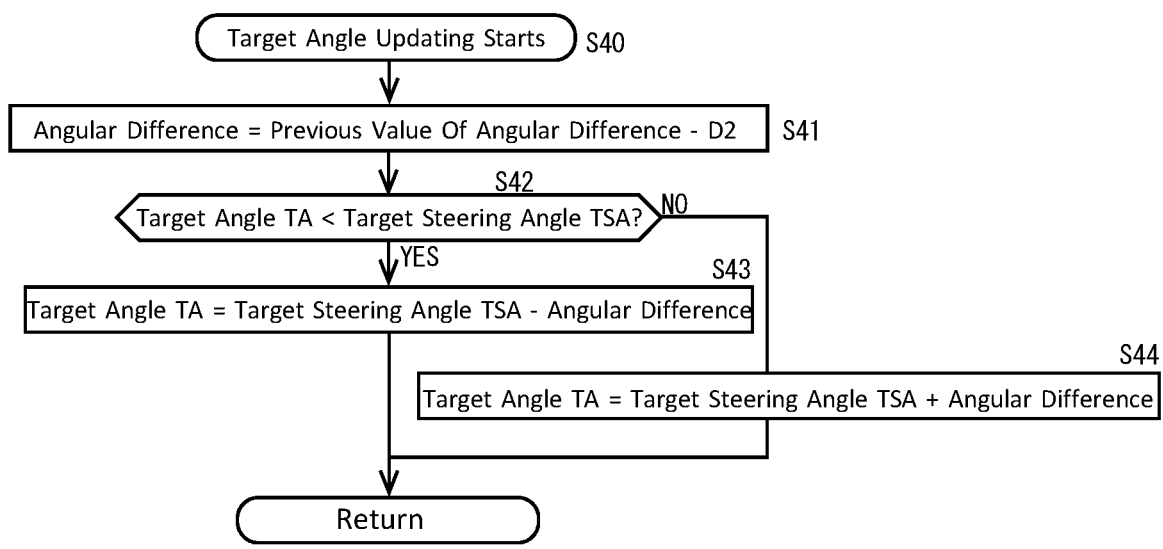
FIG. 11 is a flowchart illustrating the details of target angle update processing in FIG. 10.

Referring to FIG. 11, in the target angle update processing (S40), firstly, the correction section 141 in the target angle setting section 14 updates the angular difference based on the following equation (S41).

Angular difference=previous angular difference−Δ2

Here, Δ2 is a predetermined angle. In short, in the case of the present embodiment, each time the target angle update processing (S40) is executed, the angular difference between the target angle TA and the target steering angle TSA is reduced. In other words, during execution of the transient control, even if the pilot or the like operates the steering member 21 to make the target steering angle TSA move away by a large amount from the target angle TA in the same direction as the direction of change of the target angle TA, the target angle TA is set such that an angular difference with respect to the target steering angle TSA in question becomes smaller than the previous angular difference. In other words, in the present embodiment, the change amount of the target angle TA is automatically regulated based on fluctuations in the target steering angle TSA. Therefore, even if the target steering angle TSA fluctuates, the transient control ends within a predetermined time period that depends on the angular difference at the time point at which the steering control state is switched to the enabled state, and the steering control is then switched from the transient control to the normal control (steering based on the target steering angle TSA). As a result, in a case where the aforementioned exceptional motion occurs due to an operation by the pilot or the like, the steered wheel 6 swiftly operates in accordance with the operation by the pilot or the like.

After updating the angular difference in step S41, the correction section 141 in the target angle setting section 14 updates the target angle TA so as to realize the updated angular difference (S42 to S44). Specifically, the correction section 141 compares the target angle TA with the target steering angle TSA (S42). If the target angle TA is smaller than the target steering angle TSA (Yes in S42), the correction section 141 updates the target angle TA based on the following equation (S43).

Target angle TA=target steering angle TSA−angular difference calculated in step S41

On the other hand, if the target angle TA is equal to or greater than the target steering angle TSA in step S42 (No in S42), the correction section 141 updates the target angle TA based on the following equation (S44).

Target angle TA=target steering angle TSA angular difference calculated in step S41

After finishing the foregoing process, the processing proceeds to step S12 in FIG. 10. The operations thereafter are the same as in the steering control processing S200 (FIG. 8) of the first embodiment.

Third Embodiment

In the embodiments described above, when the aircraft is landing, the steered wheel 6 is in a free-caster state during the period until the steered wheel 6 touches down and stable taxiing is being performed (prior to the time t1). Therefore, it is considered that, in a case where the steered wheel 6 receives some kind of external force during the aforementioned period, there is a possibility that the steered wheel 6 may unintentionally turn and face in a direction that differs significantly from the direction of rectilinear travel of the aircraft. Therefore, according to the third embodiment, in the disabled state of the steering control until the steered wheel 6 touches down and stable taxiing is being performed, the steered wheel 6 is not placed in a free-caster state and, irrespective of an operation by the pilot or the like, control (hereunder, referred to as "neutral control") is performed so as to maintain the actual steering angle ASA of the steered wheel 6 at the actual steering angle (0°) in a case where the aircraft is travelling rectilinearly during taxiing. In this embodiment, although the actual steering angle ASA is controlled so as to be continuously maintained at 0° while the steering control state is the disabled state, when the steering control state is switched to the enabled state, in a case where the target steering angle TSA deviates from 0° due to an operation performed by the pilot or the like, the target steering angle TSA and the actual steering angle ASA will be different from each other. Even in such a case, according to the present embodiment, the occurrence of an abrupt movement of the steered wheel 6 can be suppressed. Hereunder, the third embodiment is described.

Figure 12:
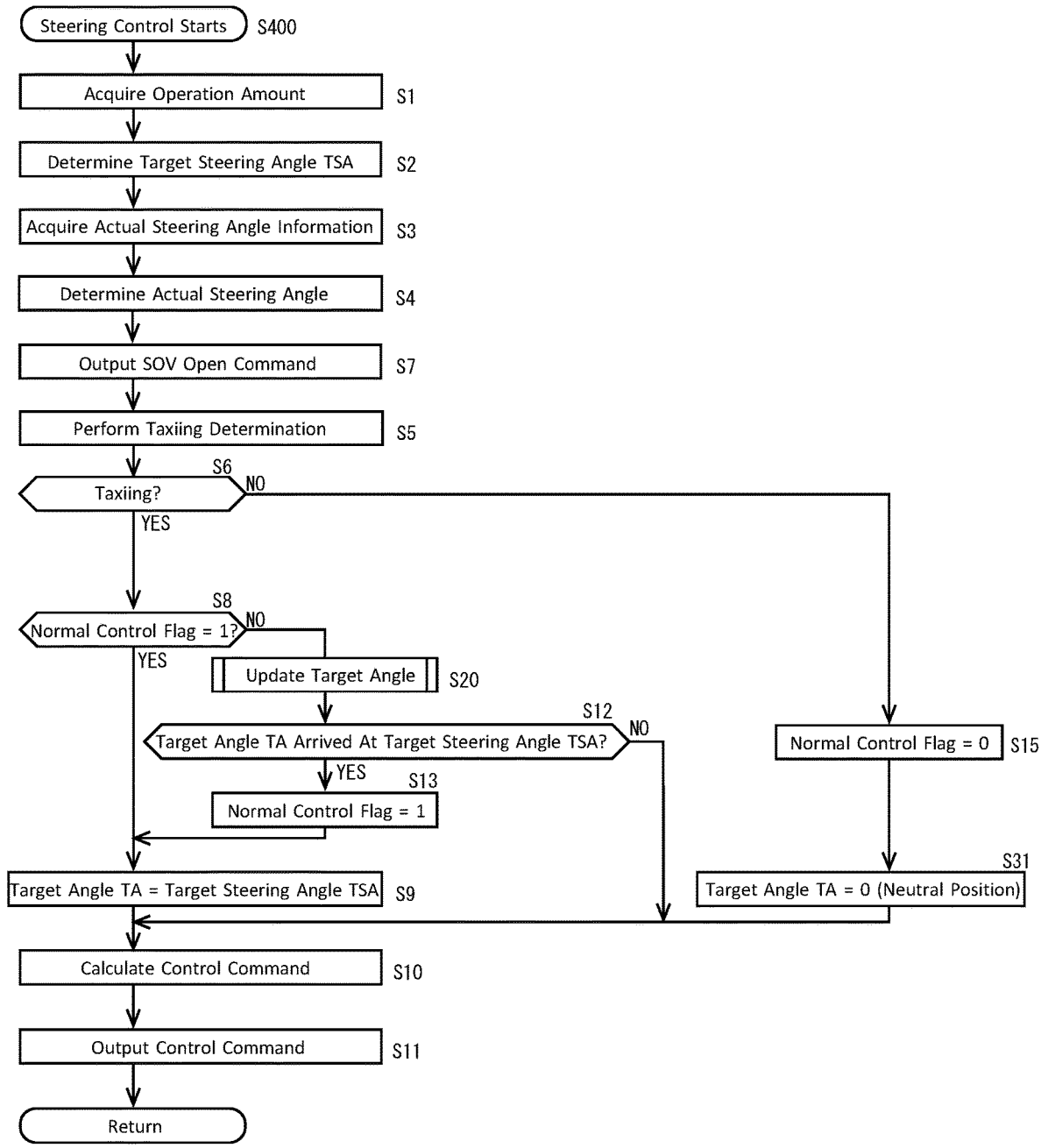
FIG. 12 is a flowchart illustrating the details of steering control processing according to a third embodiment.

The configuration of a steering control apparatus 1 of the third embodiment is the same as in the first embodiment. FIG. 12 is a flowchart illustrating steering control processing (S400) performed by the steering control apparatus 1 of the third embodiment. Referring to FIG. 12, in the steering control processing (S400), after determining a target steering angle TSA and an actual steering angle ASA (S1 to S4), the steering control apparatus 1 outputs an SOV open command (S7). In other words, according to the steering control processing (S400), the shutoff valve 53 is always open, and the driving apparatus 5 is always in a control-enabled state.

In FIG. 12, after executing step S7, the control state switching section 11 makes a taxiing determination (S5 and S6). If the result of the determination is that the steered Wheel 6 is not landed and performing stable taxiing (No in S6), the target angle setting section 14 sets the normal control flag to "0" (S15), and sets the target angle TA to 0° (that is, the neutral position that is the actual steering angle of the steered wheel 6 when the aircraft is travelling rectilinearly during taxiing) (S31).

After setting the target angle TA, the instruction section 15 of the steering control apparatus 1 calculates and outputs a control command for deflecting the steered wheel 6 (S10 and S11). By this means, the actual steering angle ASA of the steered wheel 6 is controlled so as to be maintained at 0° until the steered wheel 6 contacts the ground and starts stable taxiing (until the result "Yes" is obtained in S6). The other operations are the same as in the first embodiment.

By means of the operations described above, according to the present embodiment, because the actual steering angle ASA of the steered wheel 6 is controlled so as to always be 0° until the steering control state changes into the enabled state, when the steered wheel 6 touches down, the direction of the steered wheel 6 can be definitely made to match the longitudinal direction of the aircraft. On the other hand, even in a case where the target steering angle TSA deviates significantly from 0° due to an operation by the pilot or the like when the steering control state has changed into the enabled state, an abrupt operation of the steered wheel 6 can be suppressed, similarly to the first embodiment.

Embodiments of the present invention have been described above. However, the foregoing embodiments are merely examples for implementing the present invention. Accordingly, the present invention is not limited to the above embodiments, and the above embodiments can be appropriately modified within the scope thereof without departing from the gist of the present invention.

Figure 13:
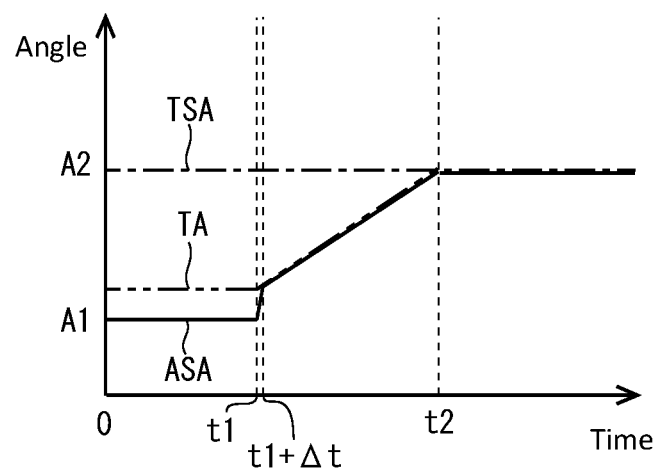
FIG. 13 is a view illustrating changes in a target steering angle, a target angle and an actual steering angle with the passage of time in a steering control apparatus of the present embodiment, which is different from FIG. 5.

In the aforementioned embodiments, before the steering control state changes into the enabled state (before the time t1), the target angle TA is made the angle A2° that is the same as the actual steering angle ASA (see FIG. 5). However, as illustrated in FIG. 13, even if the target angle TA is not matching the actual steering angle ASA, it suffices that the target angle TA is an angle that has been brought closer to the actual steering angle ASA from the target steering angle TSA. In this case, when the steering control state changes into the enabled state, although the steered wheel 6 operates until the actual steering angle ASA reaches the target angle TA, in comparison to the conventional technology, the angle range in which the steered wheel 6 abruptly operates can be kept to a narrow range. Therefore, the stability when taxiing is enhanced in comparison to the conventional technology.

Figure 14:
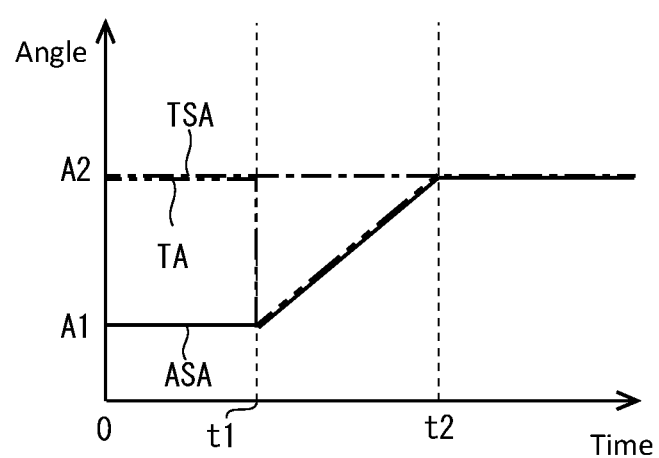
FIG. 14 is a view illustrating changes in a target steering angle, a target angle and an actual steering angle with the passage of time in a steering control apparatus of the present embodiment, which is different from FIG. 5 and FIG. 13.

According to the embodiments described above, in a period in which the steering control state is the disabled state that is prior to the time t1, the target angle TA is being brought closer to the actual steering angle ASA. However, as illustrated in FIG. 14, the target angle TA may be brought closer to the actual steering angle ASA at the time t1. In short, it suffices that the target angle TA is being brought closer to the actual steering angle ASA from the target steering angle TSA at the time t1 when the steering control state changes into the enabled state.

In the aforementioned embodiments, when the target angle TA arrives at the target steering angle TSA at the time t2, the steering control apparatus 1 switches from transient control to normal control, and performs steering based on the target steering angle TSA. However, the steering control apparatus 1 may continue the transient control and not perform the normal control. Even in this case, the target angle TA is brought closer to the target steering angle TSA with the passage of time. Therefore, the actual steering angle ASA can be brought closer to the target steering angle TSA while suppressing abrupt changes in the actual steering angle ASA when the steering control is switched from the disabled state to the enabled state.

In the foregoing embodiments, the steering member 21 is a rudder pedal. However, the steering member 21 is not limited to a rudder pedal. The steering member 21 may be, for example, a control stick or the like. The steering member 21 is not particularly limited as long as the operation amount detecting apparatus 22 is capable of detecting the operation amount thereof.

In the aforementioned embodiments, the driving apparatus 5 includes the servo valve 51, the actuator 52 and the shutoff valve 53, and is supplied with pressurized hydraulic oil from the hydraulic pressure source 4. However, the driving apparatus 5 and the hydraulic pressure source 4 are not limited thereto. The driving apparatus 5 may deflect the steered wheel 6 by electric operation, and may be supplied with electric power from an electric power supply instead of pressurized hydraulic oil from the hydraulic pressure source 4. The configuration of the driving apparatus 5 is not particularly limited as long as the driving apparatus 5 is capable of deflecting the steered wheel 6.

In the aforementioned embodiments, the target steering angle determining section 12 determines the target steering angle TSA by using a table in which operation amounts and angles are registered. However, the target steering angle determining section 12 may determine the target steering angle TSA by another method. For example, the target steering angle determining section 12 may calculate the target steering angle TSA based on the operation amount signal SI2. Similarly, the actual steering angle determining section 13 may calculate the actual steering angle ASA based on the actual steering amount signal SI7.

REFERENCE SIGNS LIST

1 Steering Control Apparatus
2 Steering Gear
3 Touchdown Detection Apparatus
4 Hydraulic Pressure Source
5 Driving Apparatus
6 Steered Wheel
7 Actual Steering Angle Detecting Apparatus
11 Control State Switching Section
12 Target Steering Angle Determining Section
13 Actual Steering Angle Determining Section
14 Target angle setting section
15 Instruction Section
21 Steering Member
22 Operation Amount Detecting Apparatus
141 Correction Section
142 Switching Section

The invention claimed is:
1. A steering control apparatus for an aircraft for controlling a steering apparatus being capable of deflecting a steered wheel of landing gear of the aircraft, the steering apparatus comprising: an actual steering angle detecting apparatus detecting an actual steering amount of the steered wheel; a steering gear including a steering member and an operation amount detecting apparatus detecting an operation amount of the steering member; and a driving apparatus deflecting the steered wheel, the steering control apparatus comprising:
an actual steering angle determining section determining an actual steering angle value of the steered wheel based on the actual steering amount;
a target steering angle determining section determining a target steering angle based on the operation amount of the steering member;
a target angle setting section setting a target angle value of the steered wheel; and
a control state switching section switching between an enabled state in which steering control is performed to deflect the steered wheel such that the actual steering angle value reaches the target angle value and a disabled state in which the steering control is not performed;
wherein, the target angle setting section sets the target angle value to an angle value that is toward the actual steering angle value when switching from the disabled state to the enabled state is performed by the control state switching section.

2. The steering control apparatus for the aircraft according to claim 1, wherein:
the target angle setting section sets the target angle value and the target steering angle in a manner such that a change amount per unit time in the target angle value after switching from the disabled state to the enabled state is less than a maximum change amount per unit time in the actual steering angle value that can be realized by the driving apparatus.

3. The steering control apparatus for the aircraft according to claim 2, wherein:
when the target steering angle changes in a direction away from the target angle value with a change amount per unit time that is greater than a change amount per unit time in the target angle value, the target angle setting section sets the target angle value and the target steering angle in a manner such that a change amount per unit time in the target angle value is equal to or greater than a change amount per unit time in the target steering angle.

4. The steering control apparatus for the aircraft according to claim 1, wherein:
the target angle setting section sets the target angle value and the target steering angle in a manner such that the angular difference between the target steering angle and the target angle value decreases as time passes.

5. The steering control apparatus for the aircraft according to claim 1, wherein:
when switching from the disabled state to the enabled state is performed by the control state switching section, the target angle setting section sets the target angle value to match the actual steering angle value.

* * * * *